Patented Sept. 18, 1928.

1,684,562

UNITED STATES PATENT OFFICE.

TSUNEO SUZUKI AND SUEO SAKURAI, OF TOKYO, JAPAN, ASSIGNORS TO ZAIDAN HOJIN RIKAGAKU KENKYUJO, OF TOKYO, JAPAN.

PROCESS OF PRODUCING A NEW ACID AND ITS SALTS STRONGLY ABSORBING ULTRAVIOLET RAYS.

No Drawing. Application filed August 11, 1924, Serial No. 731,488, and in Japan December 20, 1923.

This invention relates to a compound capable of absorbing ultra-violet light and processes of making the same, and it comprises as a new substance a condensation product of grape sugar or invert sugar with para-sulfonic acid compound of phenylhydrazin, it further comprises processes in which grape sugar or invert sugar are reacted with phenylhydrazin para-sulfonic acid in water solution containing sodium acetate.

The new product, which is formed as a result of the condensation, has been termed ultrazin and it is most probably a para sulfonic acid derivative of a phenylglucosazone. It strongly absorbs ultra-violet rays, and a light filter, which is completely proof against ultra-violet rays, can be easily made from it. The new condensation products can be conveniently used to make screens for orthochromatic photography, photochronomy, color photography, and similar optical purposes. Pigments and paints opaque to ultra-violet rays may be easily manufactured from the condensation product. Likewise cloth, timber, rubber and like materials can be protected from the damaging action of said rays.

The new condensation product, "ultrazin," which, as stated, is most probably a para sulfonic acid derivative of phenylglucosazone, is a yellow crystalline mass having an acid reaction, by virtue of which various salts can be produced. As a specific example thereof: 10 parts of grape sugar or invert sugar, 20 parts of phenylhydrazin para-sulfonic acid, 20 parts of crystallized sodium acetate, and 100 parts of water are heated at 100° C. on a hot water bath. After four hours, the solution becomes dark yellow. The solution is cooled down to atmospheric temperature and about 800 parts of alcohol are then poured into the said cooled solution, prepared as described. The sodium salt of the new condensation product is thereby precipitated. This condensation product we believe to be sodium salt of phenylglucosazone para-sulfonic acid. Potassium acetate can be used in place of sodium acetate and a corresponding potassium salt obtained.

When a water solution of basic lead acetate is poured into the water solution of the sodium or potassium salt, a lemon-yellow percipitate of the corresponding basic lead salt is produced and as this is insoluble in water, it is easily separated from the solution. When this product is suspended in water and hydrogen sulphide is passed in, lead sulphide is precipitated. By filtering out the lead sulphide, a water solution of ultrazin, that is, the free acid, most probably phenylglucosazone para-sulfonic acid, remains. When the solution is evaporated in vacuum, a yellow crystalline mass of ultrazin is obtained. Various salts of the same can be easily prepared by neutralizing with different bases in the well known way.

Ultrazin, or its neutral salts and especially its potassium and sodium salts, easily dissolve in water. A 0.01% water solution of these substances is faintly yellow, and a thin layer thereof markedly absorbs ultra-violet rays. For instance, when examined by a quartz spectrograph, a layer of said 0.01% water solution one centimeter in thickness strongly absorbs the ultra-violet rays and a two centimeter layer thereof permits no trace of the rays to pass. Most of the visible rays can freely pass through the layer of the solution except that a partial absorption begins at the middle of G and H of Fraunhofer's lines and increasing in K to the ultra-violet region. The solution therefore can be applied as a liquid filter of short wave rays and especially of ultra-violet rays.

The following are further examples of application of the new products according to the invention:

(1) The ultrazin compound of either potassium or sodium is mixed with gelatine and by using such mixture a dry light filter is manufactured according to ordinary methods. When such filter contains one gram of the salt per square meter, it strongly absorbs ultra-violet rays and when it contains two grams of the salt per square meter, practically no trace of the rays passes through the filter.

(2) Nowadays, the so-called "filtergelb" is recommended as the best material for use in orthochromatic photography, photochronomy, and color photography, and it is said that, the material strongly absorbs ultra-violet rays. Comparing filters which are manufactured by using "filtergelb" and those manufactured by using ultrazin under similar conditions, that is, they absorb visible rays in equal degree, ultra-violet rays pass the former considerably while they are almost completely absorbed by the latter. Therefore, if ultrazin is used in place of filtergelb, a far more complete shutting-off of ultra-violet rays is obtained.

(3) Tautrazin has a beautiful yellow color and absorbs violet and blue rays and therefore it is used as yellow filter. But it is very ineffective for the absorption of ultra-violet rays, unless the filter contains tautrazin in an amount over three grams per square meter, it absorbs up to E lines. When it is used in less quantity than stated above, so that the filter absorbs some one of the waves between the E and H lines, the filter, in addition to the rays required, allows more or less of ultra-violet rays to pass, and therefore the required filtration of the light can not be realized. When, however, a filter is prepared by using for example, two grams of tautrazin and one gram of the ultrazin compound of sodium or potassium per square meter, ultra-violet rays can not pass therethrough. The effect of such filter is therefore far better than that of the filter prepared by using any known yellow dye alone.

(4) When a filter is prepared by using rose bengale and tautrazin, a good filter for red rays is obtained. But this filter permits ultra-violet rays to pass, which is a defect of the filter. When, however, a small quantity of ultrazin salt is added, an ideal filter for red ray is obtained because it is perfectly proof against ultra-violet rays.

(5) Toluidin blue and the like permit ultra-violet rays to pass and therefore a filter made by using such substances is not a perfect filter for ultra-violet light. When mixing such substances with ultrazin, a perfect blue filter is obtained.

(6) The basic lead salt of ultrazin is insoluble in water and is ultra-violet ray proof. This salt can be prepared from ultrazin potassium or sodium according to the above stated method, by precipitating an ultrazin salt with a basic lead salt. Various pigments can be prepared from the basic lead salt of ultrazin, and various paints may be prepared by mixing them with boiled oil, shellac varnish and the like. When coated with such paints, timber, rubber and like organic materials can be protected from the destructive action of ultra-violet rays.

(7) Ultrazin can be deposited on the surface of fiber of cloths according to usual method of depositing acids by using lead salt as a mordant. By this method the life of cloths against sun light can be greatly prolonged.

We claim,

1. The process of preparing a condensation product of sugar and a parasulphonic acid compound of phenylhydrazine which comprises heating a water solution of an osazone-forming sugar, para-sulphonic acid compound of phenylhydrazine in quantity sufficient to form an osazone, and sodium acetate until the solution assumes a dark yellow color, and thereafter adding alcohol to precipitate the condensation product.

2. As a new material, the condensation product of sugar, and phenylhydrazine-para-sulphonic acid prepared in accordance with the process of claim 1 said product having the property of strongly absorbing ultra-violet light, being yellow in color, soluble in water, capable of forming insoluble heavy metal salts and being most probably a para-sulfonic acid derivative of phenylglucosazone.

In testimony whereof we affix our signatures.

TSUNEO SUZUKI.
SUEO SAKURAI.